(12) United States Patent
Ninomiya et al.

(10) Patent No.: US 11,190,112 B2
(45) Date of Patent: Nov. 30, 2021

(54) VIBRATION WAVE MOTOR AND DRIVE DEVICE USING THE SAME

(71) Applicant: CANON KABUSHIKI KAISHA, Tokyo (JP)

(72) Inventors: Shunsuke Ninomiya, Yokohama (JP); Ryo Yamasaki, Tokyo (JP); Makoto Oikawa, Yokohama (JP); Kazuharu Osawa, Kawasaki (JP); Ryo Abe, Funabashi (JP); Kenta Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 16/394,398

(22) Filed: Apr. 25, 2019

(65) Prior Publication Data

US 2019/0341863 A1 Nov. 7, 2019

(30) Foreign Application Priority Data

May 1, 2018 (JP) .............................. JP2018-088024

(51) Int. Cl.
*H02N 2/02* (2006.01)
*G02B 7/02* (2021.01)
*H02N 2/00* (2006.01)

(52) U.S. Cl.
CPC .............. *H02N 2/026* (2013.01); *G02B 7/02* (2013.01); *G02B 7/023* (2013.01); *H02N 2/006* (2013.01); *H02N 2/0065* (2013.01)

(58) Field of Classification Search
CPC ...... H02N 2/026; H02N 2/006; H02N 2/0065; H02N 2/0055; H02N 2/001; G02B 7/023; G02B 7/02
See application file for complete search history.

(56) References Cited

U.S. PATENT DOCUMENTS 9,091,805 B2 7/2015 Yamasaki et al.
9,143,058 B2 9/2015 Oikawa et al.
(Continued)

FOREIGN PATENT DOCUMENTS

JP 5969976 B2 8/2016

OTHER PUBLICATIONS

U.S. Appl. No. 16/213,144, Inventors Mai Nakabayashi Ryo Yamasaki Yasufumi Yamamoto Shunsuke Ninomiya, filed Dec. 7, 2018, Group Art Unit 2833
(Continued)

*Primary Examiner* — Emily P Pham
(74) *Attorney, Agent, or Firm* — Venable LLP

(57) ABSTRACT

A vibration wave motor includes a first holding member; a second holding member; a first regulating region; and a second regulating region, wherein a position of a first contact region of the first holding member, which comes into contact with the first regulating region, is different from a position of a second contact region of the second holding member, which comes into contact with the second regulating region, and wherein a position of the first regulating region is different from a position of the second regulating region in the relative movement direction so that, in the relative movement direction, a difference between a distance from the first contact region to the first regulating region and a distance from the second contact region to the second regulating region is shorter than a difference between the position of the first contact region and the position of the second contact region.

11 Claims, 5 Drawing Sheets

(56) References Cited

U.S. PATENT DOCUMENTS

| | | | |
|---|---|---|---|
| 9,158,083 B2 | 10/2015 | Oikawa et al. | |
| 9,641,104 B2 | 5/2017 | Yamasaki et al. | |
| 9,827,593 B2 | 11/2017 | Yamamoto | |
| 10,069,440 B2 | 9/2018 | Osawa et al. | |
| 10,103,650 B2 | 10/2018 | Ninomiya | |
| 10,171,008 B2 | 1/2019 | Nishitani et al. | |
| 2015/0200610 A1* | 7/2015 | Yamasaki | G02B 7/08 359/824 |
| 2017/0317614 A1* | 11/2017 | Shiono | H02N 2/0055 |
| 2017/0371125 A1 | 12/2017 | Ninomiya | |
| 2018/0088298 A1* | 3/2018 | Nishitani | G02B 7/023 |
| 2018/0097459 A1 | 4/2018 | Osawa | |
| 2018/0287516 A1* | 10/2018 | Ito | H02N 2/0065 |

OTHER PUBLICATIONS

Copending U.S. Appl. No. 16/418,514, filed May 21, 2019, to Kenta Takai et al.

\* cited by examiner

VIBRATION WAVE MOTOR AND DRIVE DEVICE USING THE SAME

BACKGROUND OF THE INVENTION

Field of the Invention

The present disclosure relates to a vibration wave motor and a drive device using the vibration wave motor.

Description of the Related Art

A vibration wave motor having characteristics such as small size and weight, high-speed driving, and silent driving is used as an actuator for a lens barrel and the like of an imaging apparatus. In a vibration wave motor disclosed in Japanese Patent No. 5969976, the vibrator support member and the base are coupled through use of the rolling members and the urging member so as to be free of backlash in the movement direction and be movable in the pressurizing direction. Further, when the vibrator and the friction member move relative to each other, the vibrator support member and the unit support member, which is configured to hold the friction member, come into contact with each other to regulate the range of relative movement.

SUMMARY OF THE INVENTION

However, the vibration wave motor disclosed in Japanese Patent No. 5969976 has the following problem. Specifically, when an impact is applied to the vibration wave motor and the vibrator support member collides with the unit support member, a relative deviation occurs between the base and the vibrator support member, with the result that the characteristics of the motor are degraded.

The present disclosure has an object to provide a vibration wave motor in which a relative deviation does not occur between members inside the vibration wave motor even when an impact is applied to the vibration wave motor.

According to one embodiment of the present disclosure, there is provided a vibration wave motor, including: a vibrator having a protruding portion; a friction member configured to come into contact with the vibrator and move relative to each other; a press mechanism configured to pressurize the vibrator against the friction member through use of a plurality of elastic members; a first holding member configured to hold the vibrator; a second holding member configured to hold the first holding member and move integrally with the first holding member; a first regulating region configured to define a movement range of the first holding member in the relative movement direction; and a second regulating region configured to define a movement range of the second holding member in the relative movement direction, wherein a position of a first contact region of the first holding member, which comes into contact with the first regulating region during the relative movement, is different from a position of a second contact region of the second holding member, which comes into contact with the second regulating region during the relative movement, in the relative movement direction, and wherein a position of the first regulating region is different from a position of the second regulating region in the relative movement direction so that, in the relative movement direction, a difference between a distance from the first contact region to the first regulating region and a distance from the second contact region to the second regulating region is smaller than a difference between the position of the first contact region and the position of the second contact region.

According to the present disclosure, a vibration wave motor in which a relative deviation does not occur between members inside the vibration wave motor even when an impact is applied to the vibration wave motor can be provided.

Further features of the present invention will become apparent from the following description of exemplary embodiments with reference to the attached drawings.

DESCRIPTION OF THE EMBODIMENTS

Figure 1A:
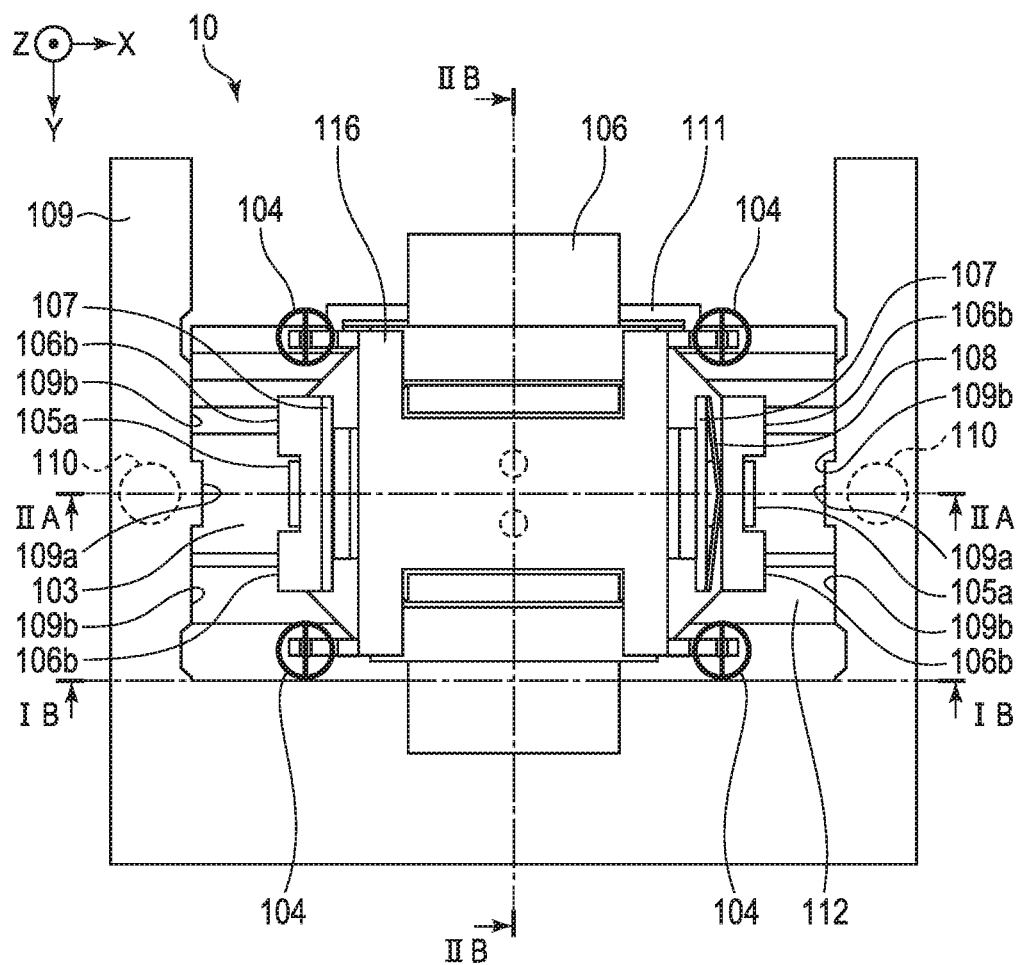
FIG. 1A is a plan view for illustrating a configuration of a vibration wave motor (10).

Embodiments will now be described in detail in accordance with the accompanying drawings.

In the drawings, the same reference symbols represent the same members. In the specification, a relative movement direction in which a vibrator 100 and a friction member 103, which are described later, move relative to each other is referred to as "X-direction", and a pressurizing direction in which the vibrator 100 is pressurized against the friction member 103 is referred to as "Z-direction". In the Z-direction, a direction from the vibrator 100 toward the friction member 103 is defined as "minus Z-direction", and a direction from the friction member 103 toward the vibrator 100 is defined as "plus Z-direction". Moreover, a direction which is orthogonal to the X-direction and to the Z-direction is referred to as "Y-direction".

EMBODIMENT

Figure 1B:
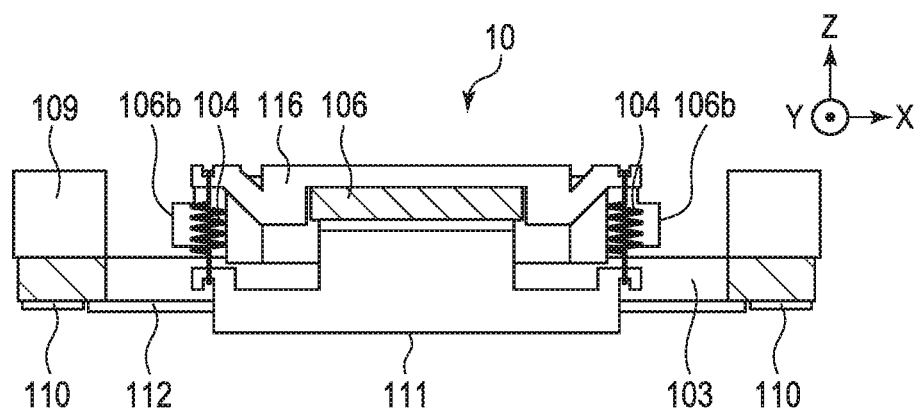
FIG. 1B is a sectional view taken along the sectional line IB-IB of FIG. 1A.
Figure 2A:
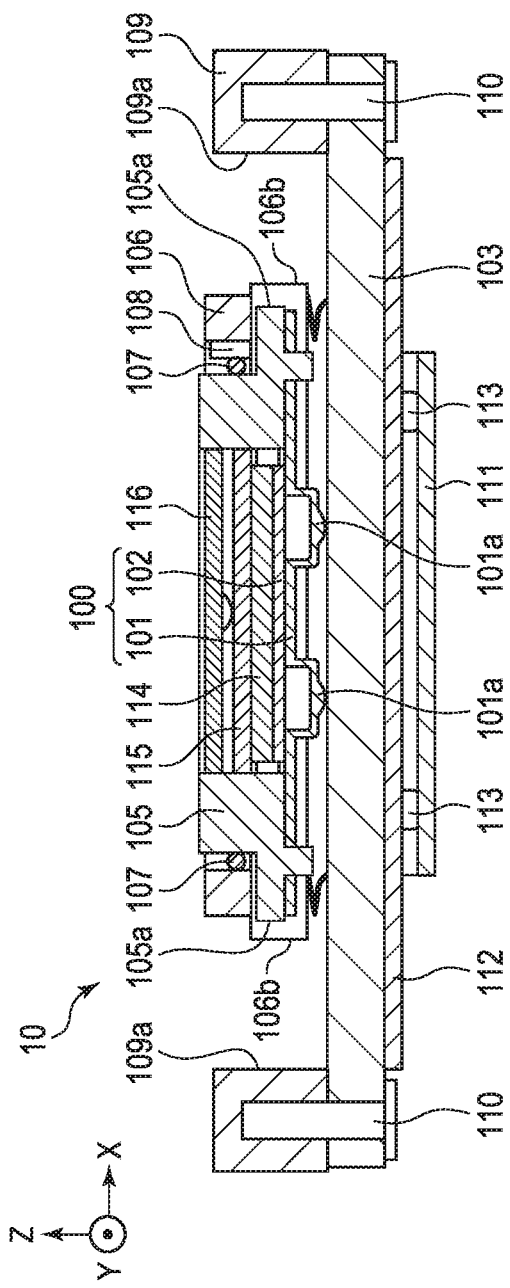
FIG. 2A is a sectional view taken along the sectional line IIA-IIA of FIG. 1A.
Figure 2B:
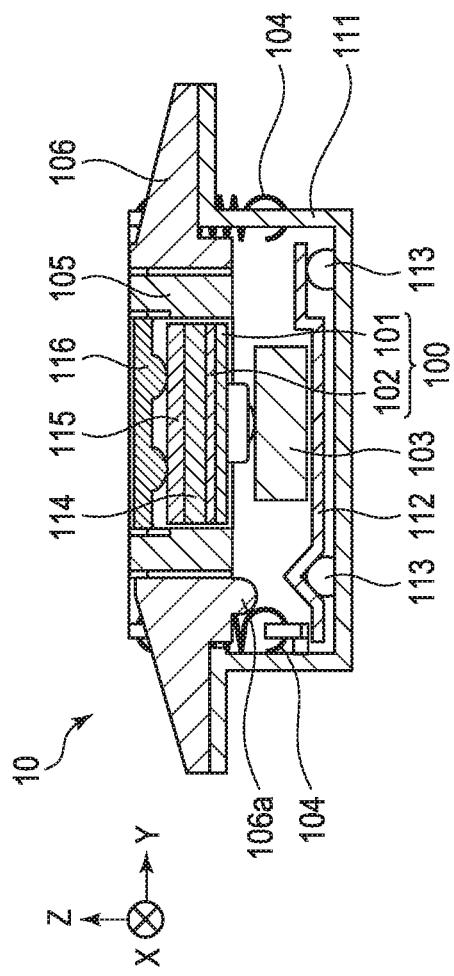
FIG. 2B is a sectional view taken along the sectional line IIB-IIB of FIG. 1A.

First, a configuration of a vibration wave motor 10 (ultrasonic motor) of the embodiment is described. FIG. 1A is a plan view of the vibration wave motor 10 of the embodiment, and FIG. 1B is a sectional view taken along the sectional line IB-IB of FIG. 1A. FIG. 2A is a sectional view taken along the sectional line IIA-IIA of FIG. 1A, and FIG. 2B is a sectional view taken along the sectional line IIB-IIB of FIG. 1A without illustration of a base member.

A vibrator 100 includes a vibration plate 101 and a piezoelectric element 102. The vibration plate 101 has two protruding portions 101*a*. Through application of voltage to the piezoelectric element 102 by a power supply device (not shown), the piezoelectric element 102 performs high-frequency vibration (vibration having a frequency in an ultrasonic region). The piezoelectric element 102 is fixed to the vibration plate 101 by means such as an adhesive, and the entire vibrator 100 is excited by the high-frequency vibration of the piezoelectric element 102.

The friction member 103 is a member configured to come into contact with the vibrator 100, and is fixed to a base member 109 by fixing screws 110. The high-frequency vibration of the vibrator 100 causes elliptical movement of the protruding portions 101*a*. When the vibrator 100 is pressurized against the friction member 103 by press members 104 (described later), the vibrator 100 and the friction member 103 move relative to each other due to the elliptical movement described above.

A holding member 105 is a member configured to hold the vibrator 100, and the vibrator 100 is fixed to the holding member 105 by means such as an adhesive or screws. The fixing method is not limited to the adhesive or the screws as long as the vibrator 100 is to be fixed. Movable members 106 are members configured to hold the holding member 105, and the holding member 105 is coupled to and held by the movable member 106 through intermediation of two rolling members 107 and one urging member 108. Each of the two rolling members 107 is provided between the holding member 105 and the movable member 106 in the X-direction, and one of the rolling members 107 is urged by the urging member 108 in the X-direction. With such a configuration, the holding member 105 and the movable member 106 are coupled so as to be integrally movable in the relative movement direction without backlash and be freely movable in the Z-direction. The vibrator 100, the holding member 105, and the movable member 106 are integrally moved relative to the friction member 103 by the high-frequency vibration of the vibrator 100. The holding member 105, the movable member 106, the base member 109, and the fixing screws 110 correspond to a first holding member, second holding members, a third holding member, and fixing means in the present disclosure, respectively.

The press members 104 (press mechanism) are tension springs being four elastic members, and act on a pressing plate 116 and a movable plate 111. A pressing force is applied from the pressing plate 116 to the vibrator 100 through intermediation of an elastic plate 115 and the friction member 103 to pressurize the vibrator 100 against the friction member 103. The elastic plate 115 serves to prevent the piezoelectric element 102 from being damaged due to application of a local pressing force on the piezoelectric element 102 by a protruding portion of the pressing plate 116 and to distribute the pressing force evenly on an entire surface of the piezoelectric element 102. The buffer member 114 provided between the elastic plate 115 and the vibrator 100 prevents attenuation of the high-frequency vibration of the vibrator 100 caused by the elastic plate 115 which comes into direct contact with the vibrator 100. The configuration of the press members 104 is not limited to the configuration of the embodiment, and compressed springs or the like may be used instead.

The base member 109 has a rectangular shape, but may have a rectangular shape having one side being open as illustrated in FIG. 1A. The base member 109 is fixed to a lens drive device 1 (described later) to fix the vibration wave motor 10. Further, the base member 109 has first regulating portions 109*a* and second regulating portions 109*b* to define a movement range of the vibrator 100 which moves relative to the friction member 103. Each of the first regulating portions 109*a* is formed near the fixing screws 110, and the two second regulating portions 109*b* are formed to sandwich the first regulating portion 109*a* in the Y-direction. Both the first regulating portion 109*a* and the second regulating portions 109*b* are formed on an inner surface of the base member 109 having a rectangular shape.

A movable plate 111 is fixed to the movable member 106 by screws (not shown) or the like to move integrally with the movable member 106. A fixing plate 112 is fixed to the base member 109 by screws (not shown) or the like. As the press members 104 act on the movable plate 111, a force of urging against the fixing plate 112 is generated in the movable plate 111. A plurality of balls 113 are sandwiched between the movable plate 111 and the fixing plate 112. Then, when the movable plate 111 is moved by the high-frequency vibration of the vibrator 100, the ball members 113 roll to reduce sliding load between the movable plate 111 and the fixing plate 112, thereby allowing the vibrator 100 to move smoothly.

Figure 3A:
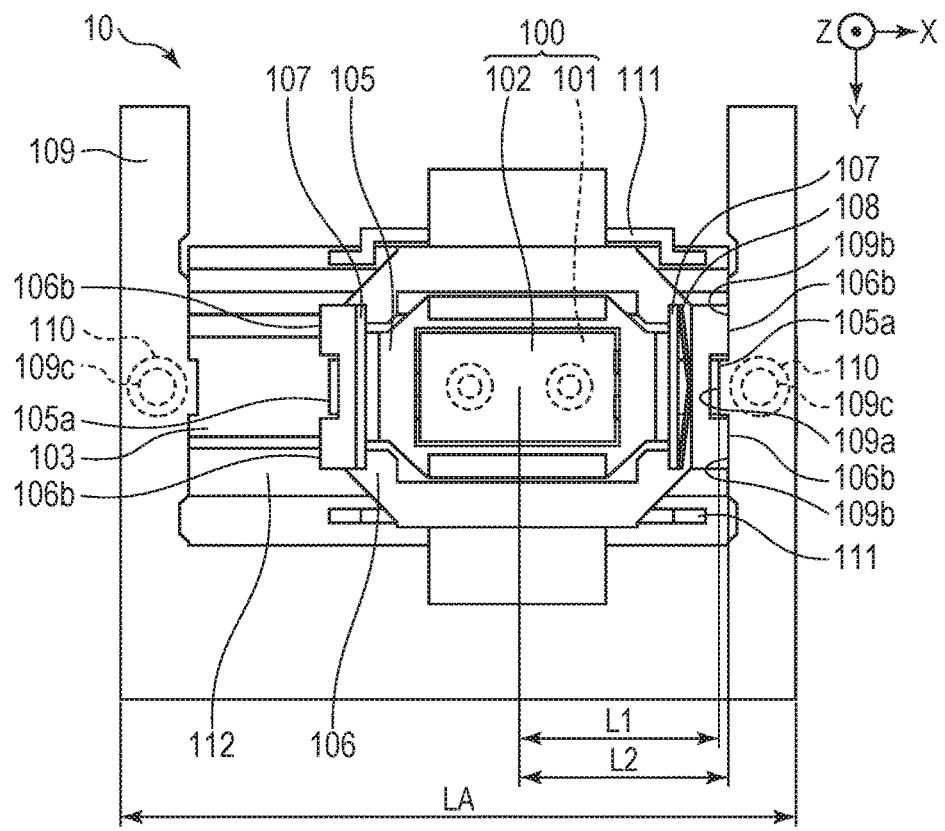
FIG. 3A is a plan view for illustrating a state in which movable members of the vibration wave motor (10) are positioned at a movement end.
Figure 3B:
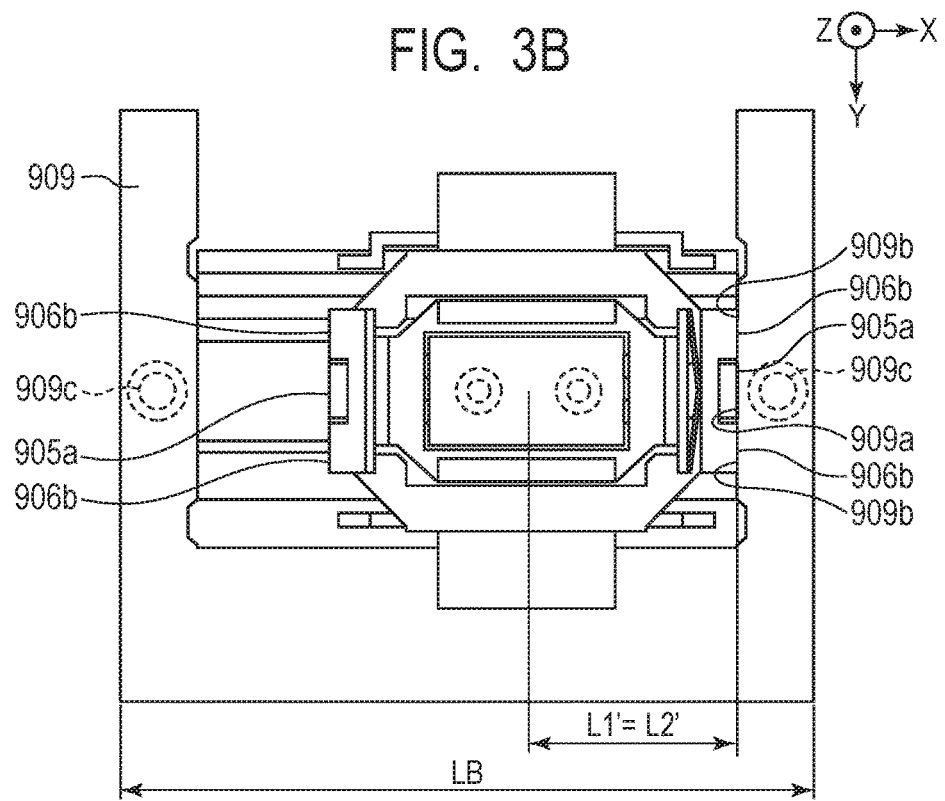
FIG. 3B is a plan view for illustrating a comparative example.
Figure 4:
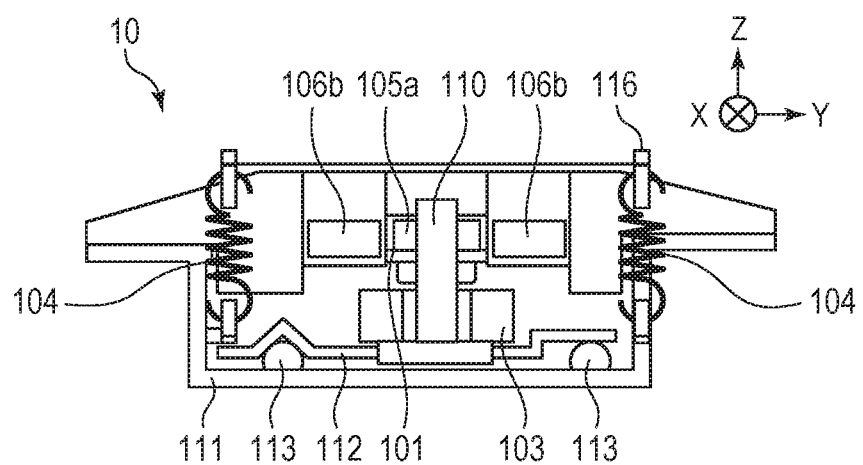
FIG. 4 is a side view for illustrating positions of a first contact surface (105*a*) and second contact surfaces (106*b*).

Next, a positional relationship between the first contact surface 105*a* and the second contact surfaces 106*b* is described. FIG. 3A is a plan view for illustrating a state in which the movable member 106 of the vibration wave motor 10 of the embodiment is positioned at a movement end of the movement range in the X-direction. FIG. 3B is a plan view for illustrating a comparative example having a configuration different from that of the embodiment. In FIG. 3A and FIG. 3B, the press members 104, the buffer member 114, the elastic plate 115, and the pressing plate 116 are not illustrated. FIG. 4 is a side view for illustrating positions of the first contact surface 105*a* and the second contact surfaces 106*b*, and the base member 109 is not illustrated.

In the holding member 105, the first contact surface 105*a* which comes into contact with the first regulating portion 109*a* is formed. Further, in the movable member 106, two second contact surfaces 106*b* which come into contact with the second regulating portions 109*b* are formed. In the relative movement between the vibrator 100 and the friction member 103, the first contact surface 105*a* comes in contact with the first regulating portion 109*a*, and the second contact surfaces 106*b* come into contact with the second regulating portions 109*b*, so that the movement range, in which the vibrator 100 and the friction member 103 move relative to each other, is defined. The first regulating portion 109*a* (first regulating region) and the second regulating portions 109*b* (second regulating regions) are formed to come into contact with the first contact surface 105*a* (first contact region) of the holding member 105 and the second contact surfaces 106*b* (second contact regions) of the movable member 106 at the movement end of the movement range. The first regulating portion 109*a* and the second regulating portions 109*b* form a regulating portion of the present disclosure, and the regulating portion is formed on the third holding member (base member 109).

With reference to FIG. 4, the first contact surface 105*a* is formed at a position of overlapping with the fixing screw 110, which is configured to fix the friction member 103 to the base member 109, when viewed in the X-direction. The second contact surfaces 106*b* are formed at positions to deviate from the first contact surface 105*a* in the Y-direction when viewed in the X-direction. Then, the first contact surface 105*a* and the second contact surfaces 106*b* are formed such that at least portions thereof overlap with each other in the pressurizing direction in which the press members 104 pressurize the vibrator 100. In other words, the first contact surface 105*a* and the second contact surfaces 106*b* are formed such that at least the respective portions thereof are positioned on a predetermined plane orthogonal to the pressurizing direction in which the press members 104 pressurize the vibrator 100. With such a configuration, the vibration wave motor can be configured without being increased in size in the pressurizing direction compared to the case in which the first contact surface 105a and the second contact surfaces 106b are formed side by side in the pressurizing direction.

Further, with reference to FIG. 3A, in the relative movement direction when viewed in the pressurizing direction, the second contact surfaces 106b are formed at positions farther away from the vibrator 100 than the first contact surface 105a. That is, a distance L2 from the center of the vibrator 100 in the X-direction to the second contact surfaces 106b is larger than a distance L1 from the center of the vibrator 100 in the X-direction to the first contact surface 105a. With such a configuration, a size LA in the moving direction of the vibration wave motor 10 can be reduced.

Now, realization of the small-sized configuration of the present disclosure is described in comparison with a comparative example having a different configuration from that of the embodiment. The base member 109 is required to have a threaded hole 109c to fix the friction member 103 by the fixing screw 110. For this reason, a vicinity of the threaded hole 109c of the base member 109 is required to secure thickness and to have a large thickness in the X-direction. As described above, the first contact surface 105a is formed to overlap with to the fixing screw 110 when viewed in the relative movement direction, so that the first regulating portion 109a which comes into contact with the first contact surface 105a is required to have a large thickness. Further, the second regulating portions 109b are formed away from the screw hole 109c, so that the second regulating portions 109b can have a thickness smaller than that of the first regulating portion 109a. Therefore, the distance L2 can be set to be larger than the distance L1.

Meanwhile, FIG. 3B is a plan view for illustrating the comparative example having a configuration different from that of the embodiment, in which a distance L1' from the center of the vibrator 100 in the X-direction to a first contact surface 905a is equal to a distance L2' from the center of the vibrator 100 in the X-direction to the second contact surfaces 906b. Even in this comparative example, a vicinity of a threaded hole 909c of a base member 909 is required to secure thickness and to have a large thickness in the X-direction. However, the distance L2' is equal to the distance L1', so that the base member 909 is required to have a large thickness in the X-direction overall. As a result, the device is increased in size in the X-direction. In the vibration wave motor 10 of the embodiment illustrated in FIG. 3A, the size LA in the relative movement direction can be reduced while the vicinity of the threaded hole 109c of the base member 109 can secure thickness. That is, the size LA in the relative movement direction given when the distance L2 is larger than the distance L1 can be smaller than a size LB in the relative movement direction given when the distance L2' is equal to the distance L1'.

Next, an effect obtained by the embodiment of the present disclosure is described in comparison with the related-art configuration. As a related-art vibration wave motor, in the vibration wave motor of Japanese Patent No. 5969976, the base and the vibrator support member are coupled through intermediation of the rolling members, and the base and the vibrator support member are coupled so as to be free of backlash in the movement direction by urging the rolling member by the urging member in the movement direction. The movement range of the vibrator is defined by the vibrator support member to come into contact with the unit support member. When the vibrator support member comes into contact with unit support member, the base does not come in contact with the unit support member. For this reason, for example, in a case in which the vibrator generates the drive force to move in the movement direction in a state in which the vibrator support member is in contact with the unit support member, when the drive force of the vibrator exceeds the urging force of the urging member, the urging member is compressed and a relative deviation occurs between the base and the vibrator support member. In this way, when a force is generated in the vibrator or the base to cause a relative deviation between the base and the vibrator support member, there is a fear in that the characteristics of the vibration wave motor may be degraded.

Meanwhile, the vibration wave motor 10 of the embodiment is configured such that, at the movement end of the movement range of the relative movement between the vibrator 100 and the friction member 103, the holding member 105 comes into contact with the first regulating portion 109a, and the movable member 106 comes into contact with the second regulating portions 109b substantially at the same time. Therefore, even when a force in the plus X-direction is generated in the vibrator 100 or the holding member 105 in FIG. 3A, the holding member 105 comes into contact with the base member 109 at the movement end of the movement range, and the holding member 105 does not move in the plus X-direction. That is, a relative deviation between the holding member 105 and the movable member 106 does not occur, and hence the characteristics of the vibration wave motor 10 are not degraded.

As described above, in the embodiment, at the movement end of the movement range of the vibrator 100 and the friction member 103, the holding member 105 and the movable member 106 come into contact with the first regulating portion 109a and the second regulating portions 109b substantially at the same time, respectively. As a result, it is possible to suppress the degradation of the characteristics of the vibration wave motor 10 due to the relative deviation between the holding member 105 and the movable member 106. Further, the size LA in the movement direction of the vibration wave motor 10 can be reduced.

In the embodiment, the holding member 105 and the movable member 106 come into contact with the first regulating portion 109a and the second regulating portions 109b substantially at the same time, respectively. However, the configuration may be such that, after one of the holding member 105 and the movable member 106 first comes into contact and when a predetermined deviation amount occurs, the other of the holding member 105 and the movable member 106 comes into contact. When the holding member 105 and the movable member 106 come into contact with the first regulating portion 109a and the second regulating portions 109b substantially at the same time, the relative deviation between the holding member 105 and the movable member 106 becomes zero. However, in consideration of errors in machining and assembly, it is difficult to make the relative deviation zero. When the relative deviation between the holding member 105 and the movable member 106 is, for example, about 0.2 mm, the characteristics of the vibration wave motor 10 are not affected. For this reason, the configuration may be such that, after one of the holding member 105 and the movable member 106 first comes into contact and when a deviation of about 0.2 mm occurs, the other of the holding member 105 and the movable member 106 may come into contact. That is, the configuration may be such that a position of the first regulating portion 109a is different from positions of the second regulating portions 109b so that, in the relative movement direction, a difference between the distance from the first contact surface 105a to the first regulating portion 109a and the distance from the second contact surface 106b to the second regulating portions 109b is smaller than a difference between the position of the first contact surface 105a and the position of the second contact surfaces 106b.

Further, in the related-art configuration, for example, with the configuration in which the base and the vibrator support member come into contact with the unit support member by a deviation of 0.2 mm or less, degradation of the characteristics of the vibration wave motor is suppressed. When the vibrator support member first comes into contact with the unit support member, an unnecessary moment around the Y-axis is generated around the contact point. When this moment applies a force in a direction in which the vibrator lifts upward with respect to the friction member or in which the vibrator is pressed against the friction member, the contact state between the vibrator and the friction member is affected, and there is a fear in that the characteristics of the vibration wave motor may be degraded. Meanwhile, in the embodiment, the second contact surfaces 106b are formed at two positions deviated in the Y-direction with respect to the first contact surface 105a. For this reason, when the movable member 106 comes into contact with the base member 109, the two second contact surfaces 106b are in contact. Therefore, an unnecessary moment is not generated. Accordingly, degradation of the characteristics that occurred in the related-art configuration does not occur. Even when only one second contact surface 106b is formed, though an unnecessary moment around the Y-axis may be generated, as compared with the related-art configuration, the generation of the relative deviation between the base and the vibrator support member by the force generated in the vibrator or the base can be suppressed.

Application Example

Figure 5:
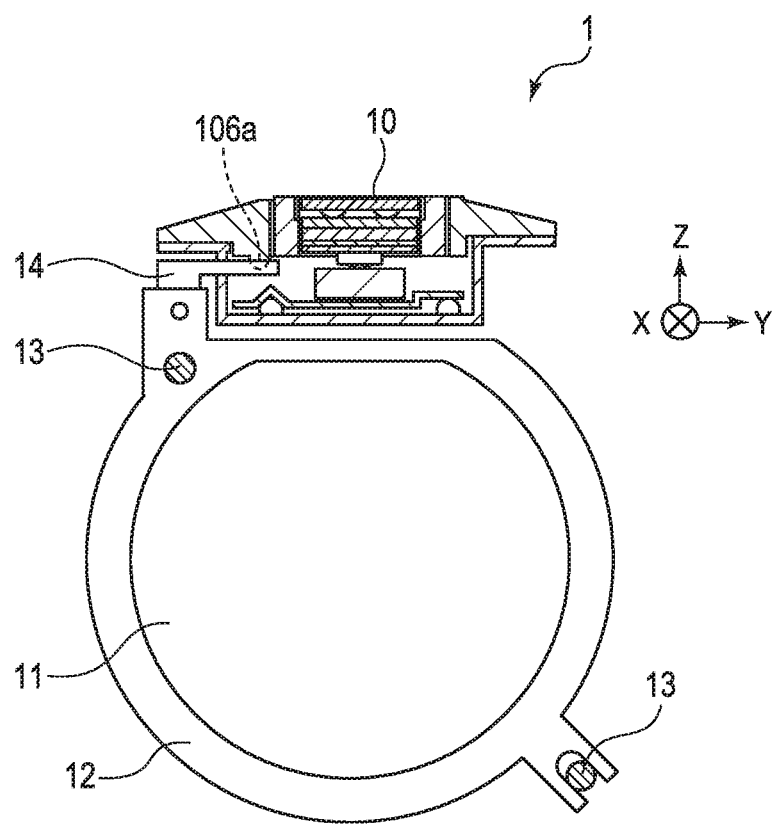
FIG. 5 is a sectional view for illustrating the configuration of a drive device (1) using the vibration wave motor (10).

FIG. 5 is a sectional view for illustrating the configuration of a lens drive device 1 as a drive device using the vibration wave motor 10 according to the embodiment. The vibration wave motor 10 is fixed to a member (not shown) by means such as screws. A lens 11 is held by a lens holding member 12, and is linearly guided in an optical axis direction (X-direction) by two guide bars 13 which are engaged with the lens holding member 12. A coupling member 14 is a member configured to couple the lens holding member 12 and the vibration wave motor 10. The coupling member 14 is held to be rotatable with respect to the lens holding member 12, and is urged by an urging means (not shown) against a drive force output portion 106a which is a spherical protruding portion provided on the movable member 106. With this configuration, the movable member 106 is coupled to the lens holding member 12 so as to move integrally in the optical axis direction. The movable member 106 and the lens holding member 12 can be moved in the optical axis direction in association with the relative movement between the vibrator 100 and the friction member 103 described above, that is, the lens 11 can be moved in the optical axis direction. The vibration wave motor 10, the lens 11, the lens holding member 12, the guide bars 13, and the coupling member 14 form the lens drive device 1 according to the present disclosure. Though the lens drive device 1 has been described as a drive device using the vibration wave motor 10, a driven member to be moved by the vibration wave motor 10 is not limited to the lens 11, and the vibration wave motor 10 may be applied to a drive device such as an imaging device which moves an imaging element to move a driven member by the motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-088024, filed May 1, 2018, which is hereby incorporated by reference herein in its entirety.

What is claimed is:

1. A vibration wave motor comprising:
a vibrator having a protruding portion;
a friction member configured to come into contact with the vibrator and move relative to the vibrator;
a press mechanism configured to pressurize the vibrator against the friction member through use of a plurality of elastic members;
a first holding member configured to hold the vibrator;
a second holding member configured to hold the first holding member and move integrally with the first holding member;
a first regulating region configured to define a movement range of the first holding member in a relative movement direction; and
a second regulating region configured to define a movement range of the second holding member in the relative movement direction,
wherein a position of a first contact region of the first holding member, which comes into contact with the first regulating region during the relative movement, is different from a position of a second contact region of the second holding member, which comes into contact with the second regulating region during the relative movement, in the relative movement direction, and
wherein a position of the first regulating region is different from a position of the second regulating region in the relative movement direction so that, in the relative movement direction, a difference between a distance from the first contact region to the first regulating region and a distance from the second contact region to the second regulating region is shorter than a difference between the position of the first contact region and the position of the second contact region.

2. The vibration wave motor according to claim 1, wherein the second contact region is formed at a position farther away from the vibrator than the first contact region.

3. The vibration wave motor according to claim 1, wherein the second contact region is formed at a position deviated in the relative movement direction and in a direction orthogonal to a pressurizing direction with respect to the first contact region.

4. The vibration wave motor according to claim 1, further comprising a third holding member configured to hold the friction member,
wherein the friction member is fixed to the third holding member by fixing means, and
wherein the first contact region overlaps with the fixing means when viewed in the relative movement direction in which the vibrator is moved relative to the friction member.

5. The vibration wave motor according to claim 4, wherein the first regulating region and the second regulating region are formed in the third holding member.

6. The vibration wave motor according to claim 1, wherein at least a portion of the first contact region and at least a portion of the second contact region are positioned on a predetermined plane orthogonal to a pressurizing direction of the press mechanism.

7. The vibration wave motor according to claim 1, wherein the second holding member is configured to hold the first holding member through intermediation of a rolling member and an urging member configured to apply an urging force in the relative movement direction.

8. The vibration wave motor according to claim 1, wherein, in the relative movement direction, a difference between the position of the first regulating region and the position of the second regulating region is approximately equal to a difference between the position of the first contact region and the position of the second contact region.

9. The vibration wave motor according to claim 1, wherein the vibration wave motor is an ultrasonic motor configured to generate vibration having a frequency in an ultrasonic range.

10. A drive device comprising:
   a vibration wave motor including:
      a vibrator having a protruding portion;
      a friction member configured to come into contact with the vibrator and move relative to the vibrator;
      a press mechanism configured to pressurize the vibrator against the friction member through use of a plurality of elastic members;
      a first holding member configured to hold the vibrator;
      a second holding member configured to hold the first holding member and move integrally with the first holding member;
      a first regulating region configured to define a movement range of the first holding member in a relative movement direction; and
      a second regulating region configured to define a movement range of the second holding member in the relative movement direction,
   wherein a position of a first contact region of the first holding member, which comes into contact with the first regulating region during the relative movement, is different from a position of a second contact region of the second holding member, which comes into contact with the second regulating region during the relative movement, in the relative movement direction, and
   wherein a position of the first regulating region is different from a position of the second regulating region in the relative movement direction so that, in the relative movement direction, a difference between a distance from the first contact region to the first regulating region and a distance from the second contact region to the second regulating region is shorter than a difference between the position of the first contact region and the position of the second contact region; and
a driven member,
wherein the driven member is moved in association with the relative movement between the vibrator and the friction member.

11. The drive device according to claim 10, wherein the driven member comprises a lens, and wherein the lens is moved in an optical axis direction in association with the relative movement between the vibrator and the friction member.

* * * * *